INVENTOR
Stephen Curtis Dungan
BY Sabin C. Bronson
ATTORNEY

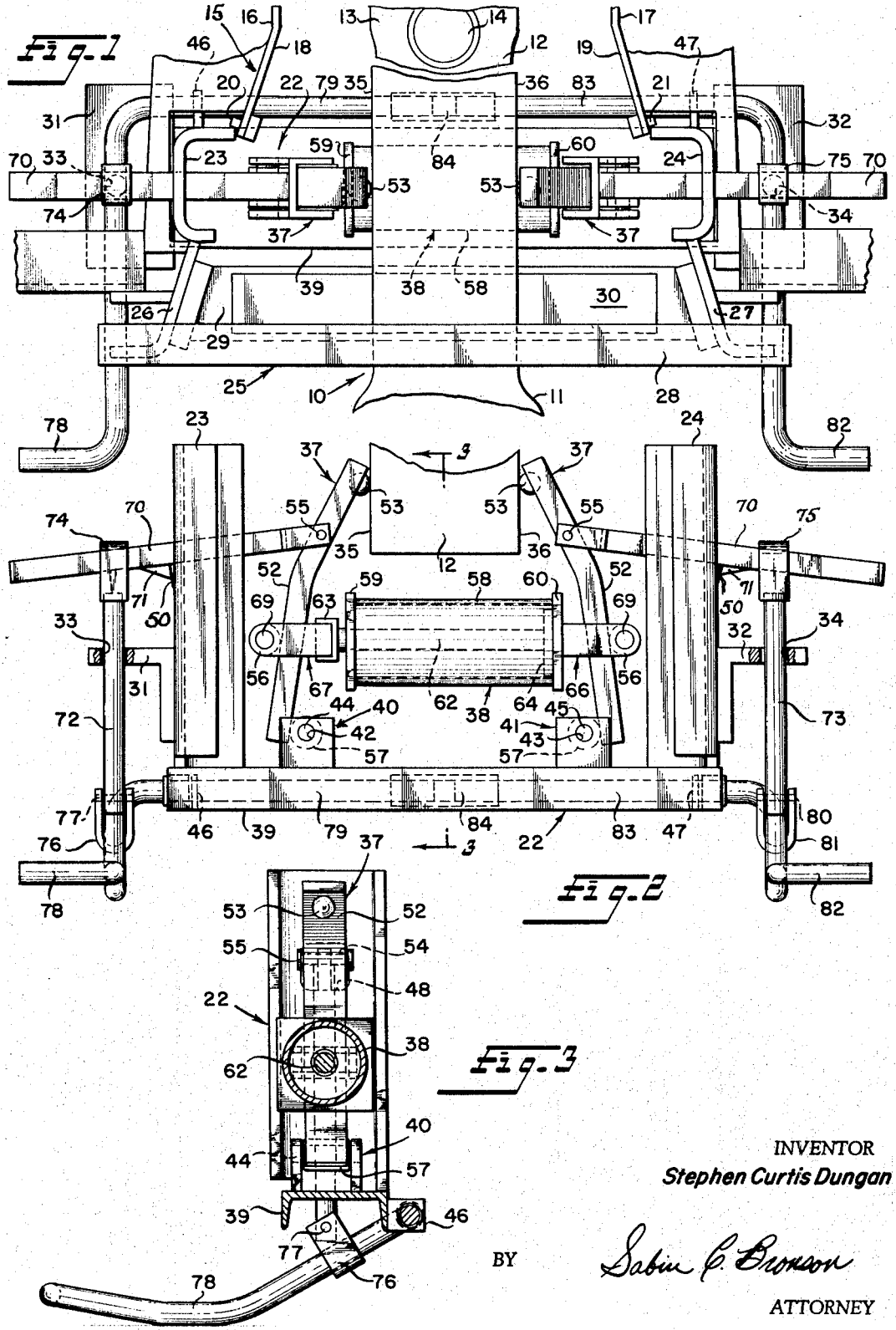

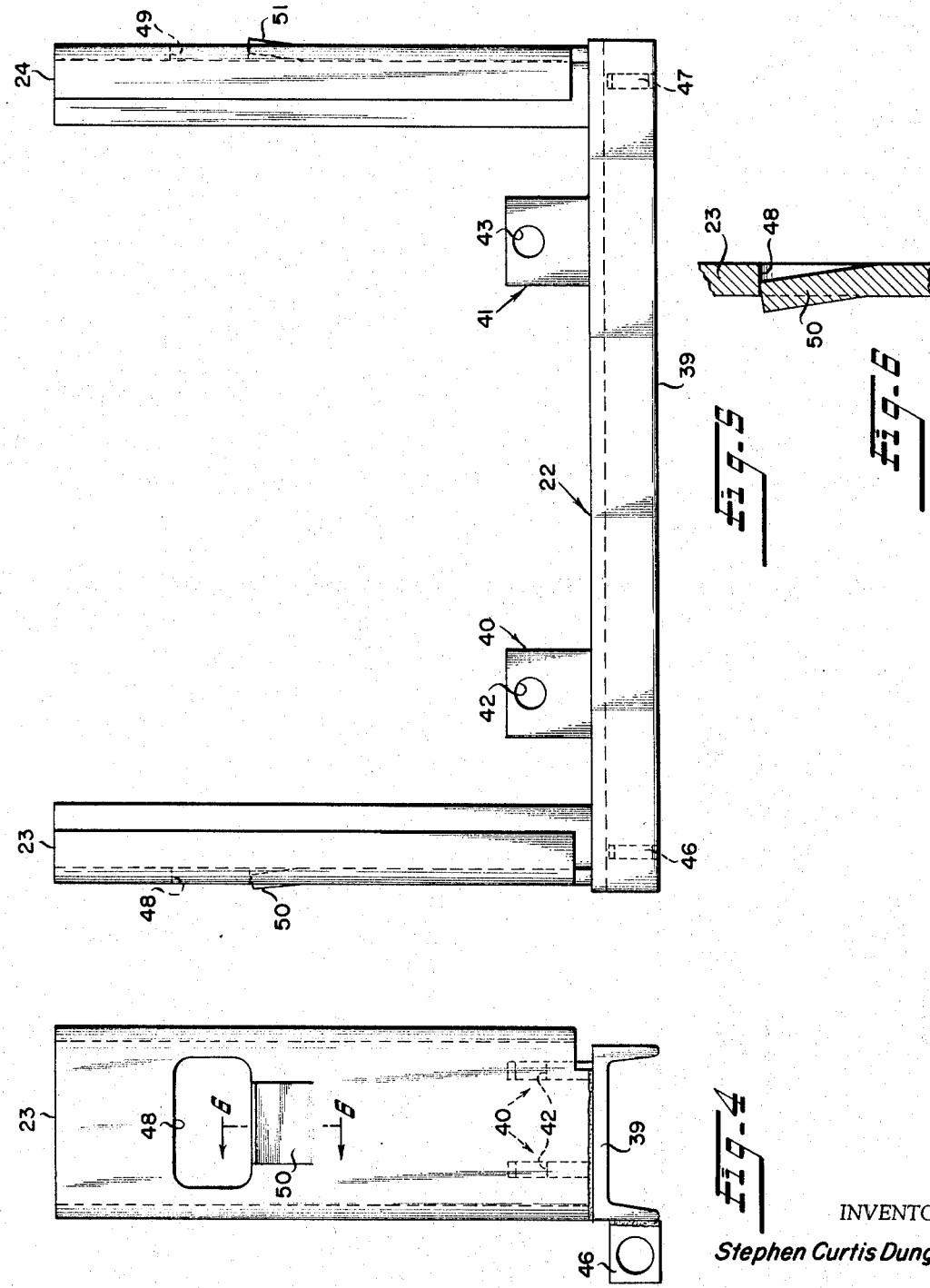

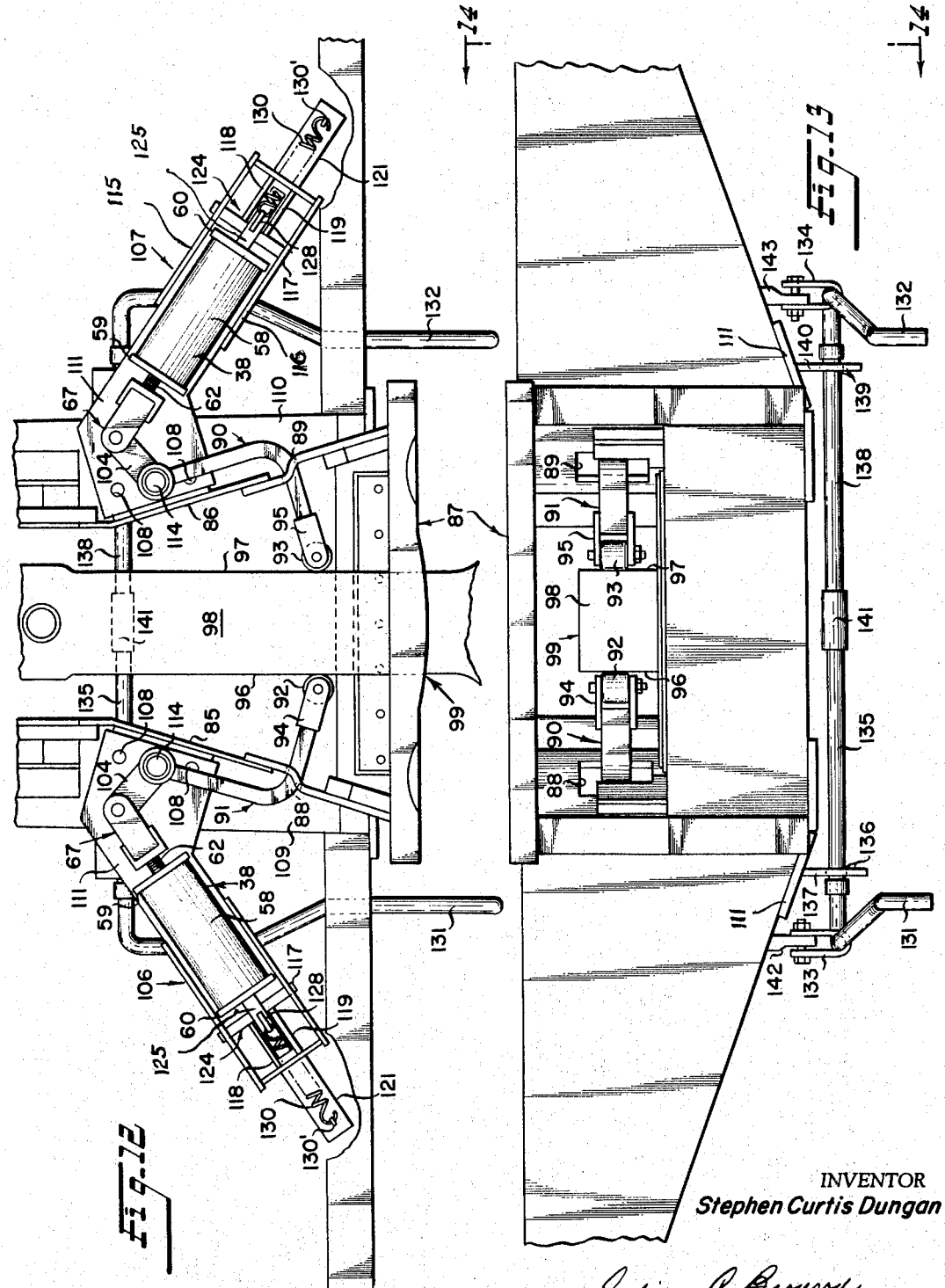

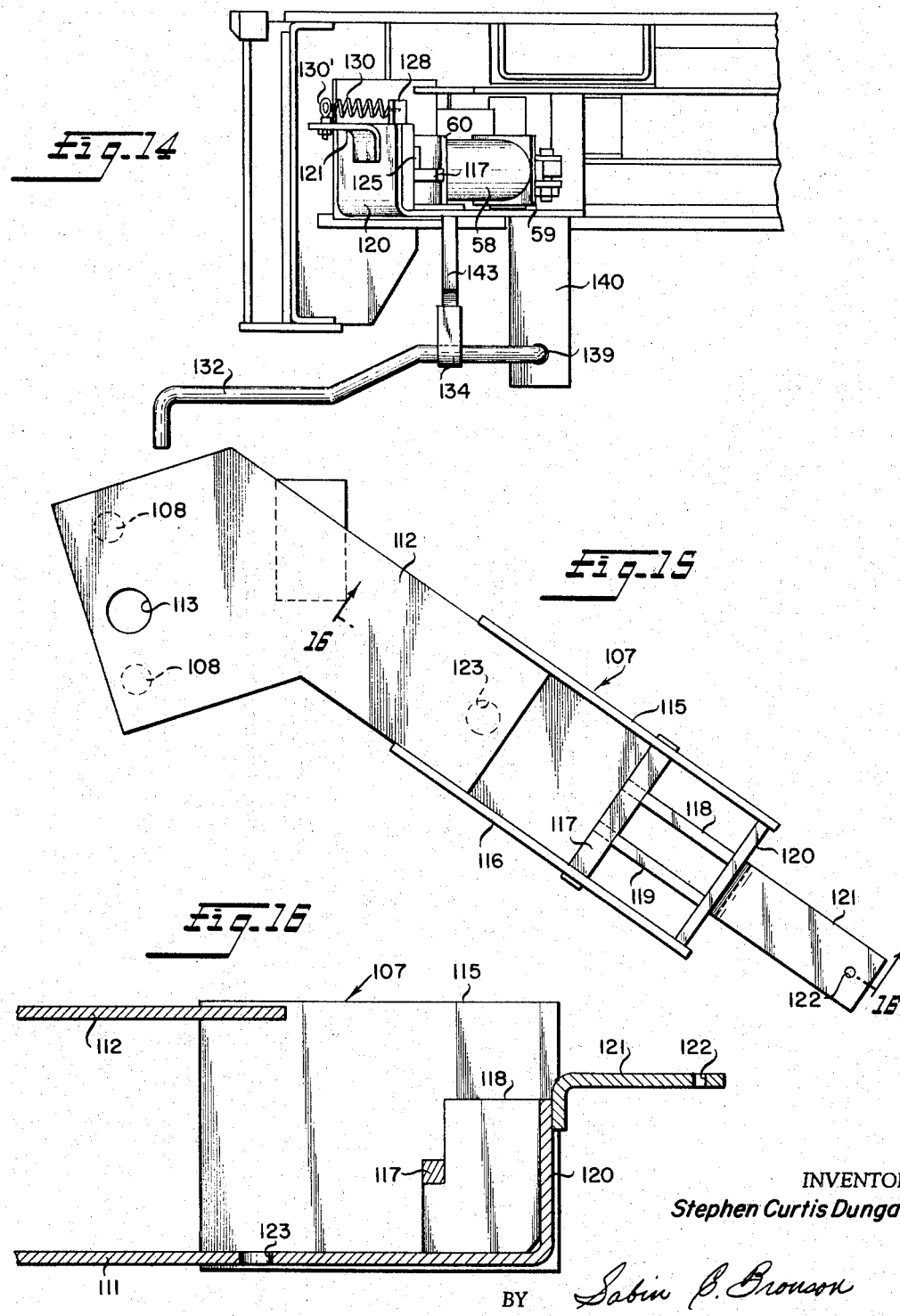

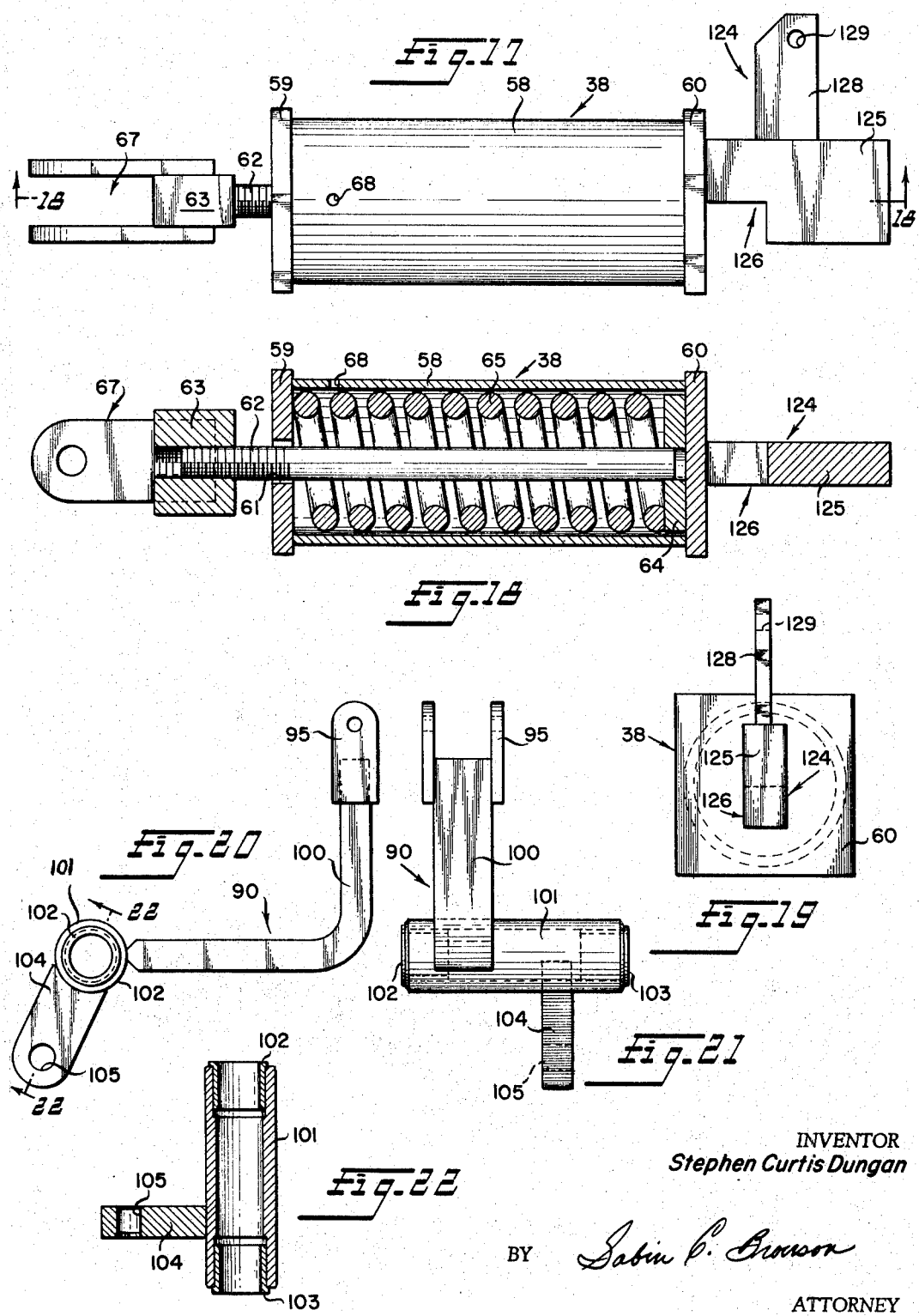

March 5, 1968 S. C. DUNGAN 3,371,802
COIL SPRING TYPE COUPLER CENTERING DEVICE
Filed March 11, 1966 8 Sheets-Sheet 7
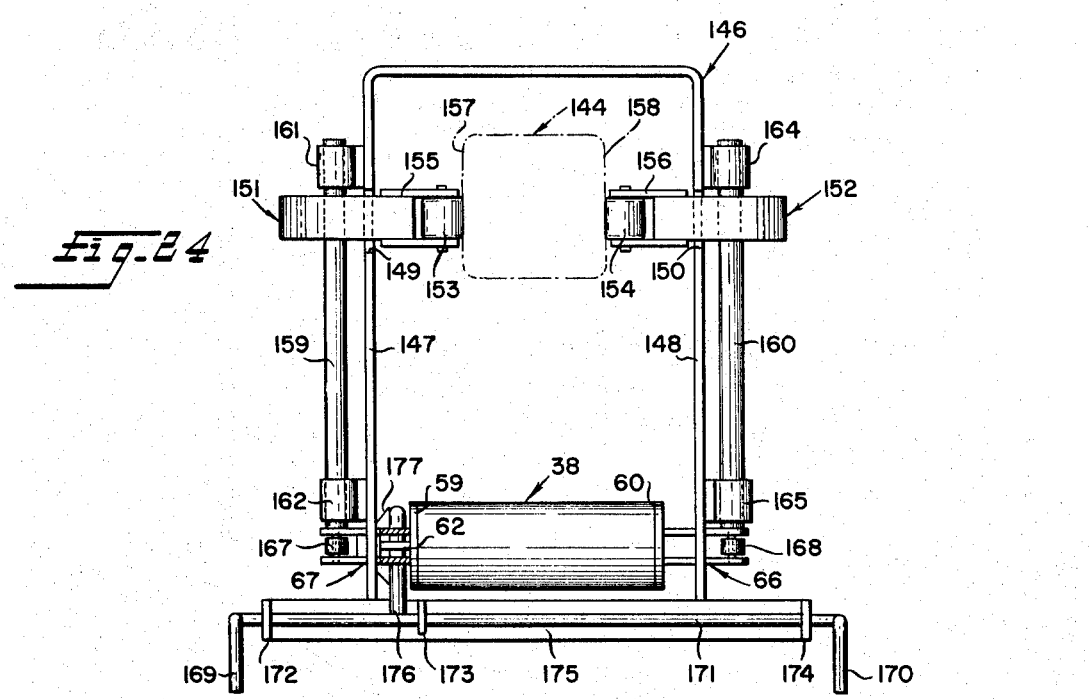
INVENTOR
*Stephen Curtis Dungan*
BY
ATTORNEY INVENTOR
Stephen Curtis Dungan United States Patent Office 3,371,802
Patented Mar. 5, 1968

3,371,802
COIL SPRING TYPE COUPLER CENTERING DEVICE
Stephen C. Dungan, Munster, Ind., assignor to Stanray Corporation, Chicago, Ill., a corporation of Delaware
Filed Mar. 11, 1966, Ser. No. 540,447
14 Claims. (Cl. 213—20)

ABSTRACT OF THE DISCLOSURE

The introduction of the "Hi-Cube" auto service box car, as well as the long flat car for piggyback service, and other new types of railroad rolling stock, has created quite a maintenance problem because of damage caused by passing couplers. Because of the wide swing required of couplers on the new cars and their unusually heavy weight, it is difficult for the average trainman to manually center the couplers according to approved practice for recoupling. This invention provides a coil spring mounted in the coupling mechanism under the coupler to automatically move the coupler to coupling range from any off center position when uncoupled.

My invention relates to a centering device for the coupling mechanism of railroad cars, and more particularly to means for attachment of said device to the striker and carrier, which means is engageable with the coupler and whereby the coupler will always be urged toward coupling range when uncoupled.

The invention is particularly adapted to long shank couplers mounted in cars having strikers with wide opening to permit greater side travel of the coupler so as to be able to negotiate standard established A.A.R. curves. This continues to result, however, in a proportionate increase in the number of instances of car damage which can be attributed to the passing of couplers.

There are many coupler centering devices on the market at the present time; in fact, my assignee has and is producing coupler centering devices actuated by leaf springs, for example (Manyek, Ser. No. 441,991), and has patented several of the coil spring type. Those of the coil spring type, however, were not designed for use with the modern wide swing couplers.

The function of any coupler centering device is to maintain a free coupler substantially in line with the longitudinal center of the car or at least within coupling range, it being remembered that coupler heads move longitudinally, laterally, and, to a limited extent, vertically.

Furthermore any such device should be provided with a releasing means whereby the coupler may be moved laterally without the device applying a force to the coupler and whereby the coupler may be positioned manually for coupling to another car on a curved portion of the track.

The object of this invention therefore is to provide a coupler centering device which will meet the above varying conditions and keep the head of a free coupler within coupling range, but which device is optionally releasable.

Another object is to provide means whereby the releasing means will automatically reengage when the coupler is returned to coupling range.

Further objects and advantages of the invention will appear in the following description thereof, taken in connection with the accompanying drawings wherein like reference characters indicate like parts, and wherein:

FIGURE 1 is a top plan of the coupler centering device illustrating one embodiment of the invention;

FIGURE 2 is a front view of the coupler centering device;

FIGURE 3 is a section on the line 3—3 of FIG. 2;

FIGURE 4 is a side elevation of the frame assembly of the embodiment shown in FIG. 2;

FIGURE 5 is a front view of FIG. 4;

FIGURE 6 is a cross sectional view on line 6—6 of FIG. 4;

FIGURE 12 is a top plan view of a double coil spring modification of the centering device, with the top cover plate removed for convenience in illustration;

FIGURE 13 is a front view of FIG. 12;

FIGURE 14 is a side view of FIG. 12;

FIGURE 15 is a plan view of the housing assembly;

FIGURE 16 is a section on the line 16—16 of FIG. 15;

FIGURE 17 is a side elevation of the spring assembly;

FIGURE 18 is a section on the line 18—18 of FIG. 17;

FIGURE 19 is an end elevation of FIG. 17;

FIGURE 20 is a plan view of the lever assembly of the device;

FIGURE 21 is a view at right angles to FIG. 20;

FIGURE 22 is a section on the line 22—22 of FIG. 20;

FIGURE 23 is a top plan view of another modification of the centering device, with the top cover plate removed for convenience of the illustration;

FIGURE 24 is a front view of FIG. 23; and

Figures 7, 8, 9:
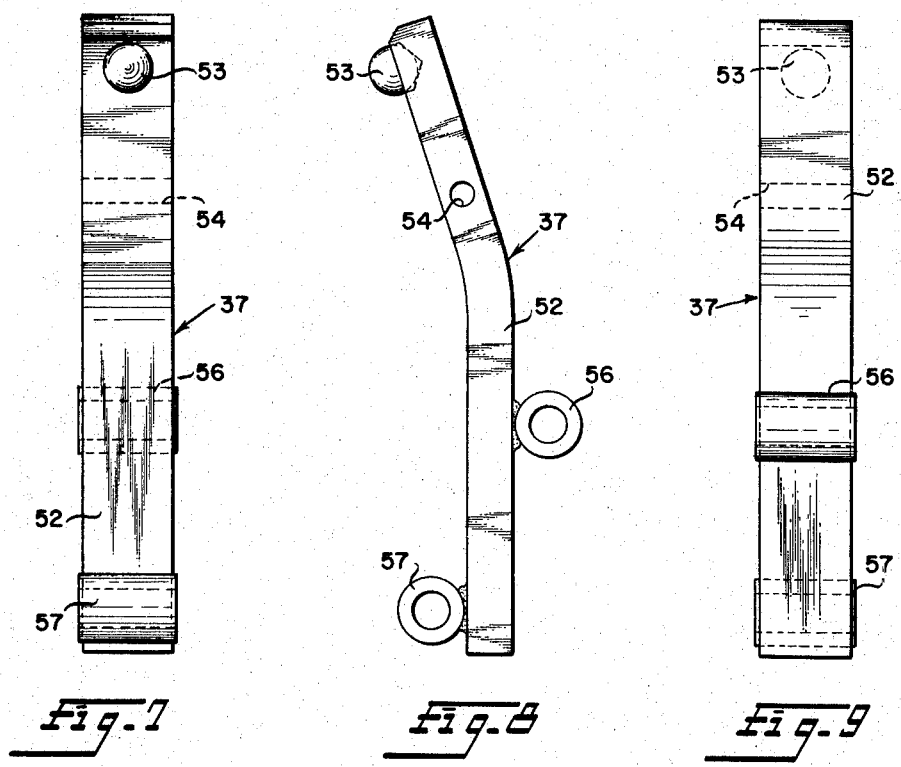
FIGURES 7, 8 and 9 are respectively side, front and inside views of the actuating arm of the device.

One embodiment of my device is shown in FIGURES 1 to 11, inclusive, and referring initially to FIG. 1 of the drawings is can be seen that a conventional coupler is generally indicated at 10 and includes the coupler head 11 and shank 12. The end 13 of shank 12 is suitably connected by means of a pivot pin 14 to a draft gear carrier within a center sill generally indicated at 15. It will be noted that the side walls 16 and 17 of the sill 15 have outwardly flared portions 18 and 19 to accommodate a wide swing of coupler 10. Reinforcing bars 20 and 21 are vertically disposed alongside the ends of the flared portions 18 nd 19 and are secured thereto by welding. The frame assembly for the centering device, which is generally indicated at 22 and is shown in more detail in FIGS. 2, 3, 4, 5 and 6 of the drawings, has a pair of upstanding channel members 23 and 24 which are secured by means of welding to the portions 18 and 19 adjacent the reinforcing bars 20 and 21.

Forward of the frame assembly of the centering device 22 an end portion of the sill 15 is indicated at 25. The side walls 26 and 27 continue the outward flare of the sill 15 to the usual striker plate 28 and coupler shank carrier assembly 29 with wear plate 30. Secured to the bases of the channel members 23 and 24 by means of welding are angle plates 31 and 32 having holes 33 and 34 therein for a purpose to be described later.

At this point it should be apparent that the embodiment of my coupler centering device now being considered is designed to be interposed into and secured to each end of a sill immediately adjacent the striker plate and coupler shank carrier assembly. As thus installed, the device is designed to be operable against the longitudinally extending side walls 35 and 36 of the coupler shank which is carried within the end portion of the sill. In FIG. 2 of the drawings the coupler centering device embodying my invention is shown in elevation as disassociated from the elements of the center sill except for the phantom drawing of the coupler shank 12. FIG. 2 is provided to clearly disclose the general arrangement of the device, and for further convenience and ease of description of the frame assembly 22 is shown in some detail in FIGS. 4, 5 and 6, the actuating arms which are generally indicated at 37—37 are shown in detail in FIGS. 7, 8 and 9, and the spring assembly, generally indicated at 38, is shown in detail in FIGS. 10 and 11 of the drawings. Other elements of the device will be discussed later in conjunction with the complete assembly of the device.

Considering now the frame assembly 22 as shown in detail in FIGS. 2 to 6, inclusive, it can be seen that there is a channel-shaped base member 39, at the ends of the web of which the upstanding channel members 23 and 24, previously discussed, are secured by welding. Also secured to the top surface of the web of the base member 39 by welding are two pairs of spaced apart bracket members generally indicated at 40 and 41. Each pair of bracket members has aligned openings 42 and 43 which receive pins 44 and 45 for a purpose to be discussed later.

Spaced brackets 46 and 47 are secured by welding to one leg of the base member 39 and have aligned openings therein. The function of these particular brackets will also be discussed later. There are also aligned openings 48 and 49 in the base section of the upstanding channel members 23 and 24, respectively. Directly below each opening 48 and 49 the base section of the channel member is split, in a manner shown in FIG. 6, and the tongue portion 50 in channel member 23 is bent slightly outward from the plane of the base. A similar tongue 51 is provided in channel 24.

The actuating arms 37—37 are clearly disclosed in FIGS. 7, 8 and 9 and it can be seen that each arm consists of a metal bar 52, the upper part of which is bent slightly to the left as viewed in FIG. 8. At the top portion of each actuating arm 37 there is a 1" diameter steel ball 53 that is secured by welding within a depression in the arm and, as seen best in FIGS. 1 and 2, these balls 53—53 are adapted to contact the sides 35 and 36 of coupler shank 12. In each bent portion of the arms 37—37 there are openings 54—54 for receiving pins 55—55 as best shown in FIGS. 2 and 3. As indicated in FIGS. 7, 8 and 9, the side of the arm 37 opposite the side which carries the ball 53 has secured to it a short section of seamless tubing 56 at a point somewhat medially of the arm's length. In addition, a section of seamless tubing 57 is secured to the lower portion of arm 37 on the same side as that on which the ball 53 is secured.

Figure 11:
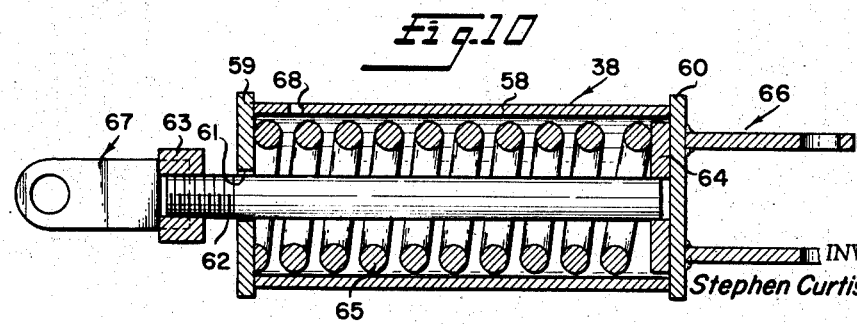
FIGURE 11 is a cross section on the line 11—11 of FIG. 10.

The spring assembly 38 consists of a metallic cylinder 58 with end plates 59 and 60 permanently fixed to the two ends of the cylinder by welding so as to close these ends. End plate 59 has an opening 61 through which a shaft 62 can project from within cylinder 58. The end of the shaft 62 lying outside cylinder 58 is threaded to receive a nut 63, while the other end of the shaft carries a piston 64 within cylinder 58. As shown in FIG. 11, a coil spring 65 is disposed around shaft 62 and between end plate 59 and the piston 64. This spring is assembled within cylinder 58 at a precompression of about 1300 pounds. A clevis, generally indicated at 66, is secured by welding to end plate 60 while another clevis, generally indicated at 67, is similarly secured by welding to the nut 63 on the shaft 62. An opening 68 is provided in cylinder 58 to prevent the air within the cylinder being compressed as piston 64 is moved.

FIG. 2 of the drawings best illustrates the manner in which the elements of the coupler centering device are assembled. As seen, the actuating arms 37—37 are pivotally mounted at their lower extremities within brackets 40 and 41 by means of pins 44 and 45 that extend through the sections of seamless tubing 57—57. The spring assembly 38 is suspended between the longitudinal medial sections of the actuating arms 37—37 by means of pins 69—69 extending through clevises 66 and 67 and the sections of seamless tubing 56—56 on the actuating arms.

A pair of stop arms 70—70 are positioned to extend through openings 48 and 49 in channel members 23 and 24. The inner ends of these arms are formed with a clevis through which pins 55—55 extend in openings 54—54 to pivotally secure the stop arms to the actuating arms 37—37. Outward of the channel members 23 and 24, as viewed in FIGS. 1 and 2, there are projections 71—71 on the stop arms 70—70 that extend downwardly and are adapted to be selectively engageable with tongues 50—50 on the channel members 23 and 24.

Disposed below the tongues 50—50 on channel members 23 and 24 are plates 31 and 32, respectively, which have been previously mentioned. Extending for guided movement through the hole 33 in plate 31 is a release arm 72 and a similar release arm 73 is received in hole 34 of plate 32. The upper ends of the release arms 72 and 73 carry loop portions 74 and 75, respectively, which loosely engage around its associated stop arm 70.

The lower end of release arm 72 is pivotally connected to a bracket 76 through a pin 77. Bracket 76 is secured to release handle 78 having a bent portion 79 extending through the opening in bracket 46 and alongside the rear side of channel 39 toward the central portion thereof. The lower end of release arm 73 is pivotally connected by pin 80 to bracket 81 on release handle 82. The bent portion 83 of the release handle 82 extends through the opening in bracket 47 and alongside the rear side of channel 39 to a point adjacent the end of the bent portion 79. The adjacent end portions of the bent portions 79 and 83 of release handles 78 and 82, respectively, are received within the coupling 84.

The operation of this embodiment of my invention just described is as follows. Consider first the situation as shown in FIGS. 1 and 2 where the coupler 10 is in its center position. In this position balls 53—53 on the actuating arms 37—37 rest against the sides 35 and 36 of coupler shank 12 but with no force on the coupler. Next, assume that the projections 71—71 of both stop arms 70—70 are engaged or latched with tongues 50—50 as seen in FIG. 2. Now if there is a sidewise movement of the coupler 10, the movement will be translated through the ball 53 and associated actuating arm 37 on that side of the coupler to produce a movement of the cylinder 58 to the right or a movement of the piston 64 toward the left. This results because the actuating arms 37—37 are received in a fixed pivot point on the top of channel 39 and are also pivotally connected to the spring assembly 38 at clevises 66 and 67. Now further assuming that the coupler sidewise movement is to the right as seen in FIGS. 1 and 2 of the drawings, the result will be that the right-hand actuating arm 37 acts to pull cylinder 58 toward the right but at the same time the left-hand actuating arm 37 will remain in position because the lock arm 70 is latched at tongue 50 on channel member 23. At this point the ball 53 on the left-hand actuating arm 37 does not contact side 35 of the coupler shank 12 and as shaft 62 and piston 64 are held in the position as shown in FIGS. 1 and 2, it will be a relative movement of cylinder 58 over piston 64. It will be recalled that spring 65 is held in the cylinder 58 at a precompression of about 1300 pounds so that as the actuating arms 37—37 are moved apart an immediate load of about 1300 pounds is applied to these arms to prevent such movement and a force is exerted to position the coupler shank 12 back to a center position in the center sill.

If it is desired to disengage the coupler centering device for coupling on a curve or any other reason, either of the release handles 78 or 82 can be manually lifted to accomplish this purpose. As an example, assume that for some reason it is desirable to move coupler 10 to the right as seen in FIGS. 1 and 2. Release handle 78 can be lifted and this upward movement is translated through release rod 72 to stop arm 70 and the projection 71 is unlatched from tongue 50. Recalling the description in the preceding paragraphs, it should now be obvious that the stop arm 70 is free to move and then shaft 62 and piston 64 can also move so that there will be no relative movement between cylinder 58 and piston 64 against the action of spring 65, and in this situation the coupler 10 can be freely moved sidewise without the restraining influence of my coupler centering device 22.

At this time it is desirable to point out the fact that by providing a ball contact between the actuating arms and the sides of the coupler shank 12 the coupler can move freely in a longitudinal direction. Furthermore, because of the particular linkage system involved it should be noted that the force on the coupler as applied through the actuating arms is less than the spring force, but that also the movement or compression of the spring 65 within the spring assembly is less than the movement of the coupler during sidewise travel.

A second embodiment of my coupler centering device is shown in FIGS. 12 to 22, inclusive, of the drawings. In this embodiment the actuating arms of the device have a roller contact with the sides of the coupler shank and are rotated about fixed shafts disposed at the sides of the flared openings of the sill. This particular embodiment which has two spring assemblies can be mounted in those situations where there is not room under a coupler for a centering device.

Referring to FIGS. 12 and 13, the flared sides of a sill are shown at 85 and 86 with a striker plate and a coupler shank carrier assembly, generally indicated at 87, being suitably connected thereto. As thus constructed, the coupler housing has openings 88 and 89 through which actuating arms, generally shown at 90 and 91, can project. Rollers 92 and 93 are mounted in clevises 94 and 95 which are carried on the arms 90 and 91 so that a rolling contact can be had with side walls 96 and 97 of coupler shank 98 of the coupler generally designated at 99. This coupler is received within the center sill in a well known manner for connection to suitable drift gear and is not thought necessary to further describe the details of this connection.

FIGS. 20, 21 and 22 of the drawings show in detail the features of the actuating arms 90 and 91, and considering the arm 90 it can be seen that this arm includes the bent portion 100 with a clevis 95 for the roller 93. At the other end of the arm a section of seamless steel tubing 101 is secured as by welding and the ends of the section of tubing 101 are closed by oilite flange bearings 102 and 103. Secured to the section of tubing 101 in a plane other than that of the bent portion of the arm 100 there is a second arm 104 having an opening 105 therein. Arm 91 has the identical features as the arm 90 just described.

Next referring to FIGS. 12, 15 and 16, housing assemblies generally indicated at 106 and 107 are secured, as by bolts 108, to plate portions 109 and 110 of the center sill so as to project outward and forward toward the striker casting as seen in FIG. 12. Each housing assembly is generally box-like in construction with a bottom plate 111 and a top plate 112. As viewed in FIG. 12, the top plate 112 on each assembly is not shown in position and this has been done so as to more clearly show the arrangement within the housing. While reference will now be made to the housing assembly 107, it will be understood that the other housing assembly 106 is identical in construction. In FIG. 15, opening 113 in top plate 112 is aligned with a similar opening, not shown, in bottom plate 111. In assembling the housing the bottom plate 111 is secured to the sill by means of bolts 108 as previously indicated and a shaft 114, see FIG. 12, is vertically positioned in the hole or opening in the bottom plate 111 and secured therein by welding. After this is done section 101 of the actuating arm 90 can be slipped over shaft 114 and top plate 112 positioned so that the top of shaft 114 projects into openings 113. Shaft 114 can be secured in the opening 113 by welding and plates 111 and 112 secured in position by welding to side plates 115 and 116.

A bar 117 is disposed through and secured in openings in the side plates 115 and 116 and is further secured in position to spaced plates 118 and 119 that are welded to bar 117 and to the bottom plate 111. It will also be noted that the bottom plate 111 is bent upward in a wall designated as 120. Space plates 118 and 119 are also welded to this wall 120. In addition, an angle bar 121 having an opening 122 is secured by welding to this wall 120. In the housing assembly it should be further noted that the bottom plate 111 has an opening 123 for a purpose to be explained later.

Turning next to a description of the spring assembly used in this embodiment and shown in detail in FIGS. 17, 18 and 19 of the drawings, it will be seen that this assembly is almost identical to that of the spring assembly 38 previously described. Consequently, the same reference numerals have been used to designate the same parts of the spring assembly and the present description will be confined to the bracket arrangement which is generally designated as 124. This bracket arrangement 124 includes the L-shaped bar member 125 secured by welding to the end plate 60 so as to form a downwardly extending keyway as best seen in FIG. 17 and generally designated as 126. A short bar member 128 with hole 129 is vertically positioned and secured by welding to the top surface of bar member 125.

Referring now to FIG. 12, it can be noted that arm 104 of actuating arm 90 is pin-connected to clevis 67 on shaft 62 of spring assembly 38. It, of course, will be understood that this spring assembly is positioned in the housing assembly 107 prior to the time that the top plate 112 is secured in place. As thus arranged, the cylinder 58 is longitudinally disposed in the housing so as to overlie the opening 123 and with the keyway 126 disposed adjacent the bar 117 for selective latching thereto. A coil spring 130 has one end fastened through hole 129 in bar member 128 and the other end fastened to an eyelet 130' secured in hole 122 of angle bar 121 (see FIG. 15) for a function which will be explained later.

As in the case of the first embodiment of my device, release means are also provided in this second embodiment. Such means include the release handles 131 and 132 with upstanding brackets 133 and 134, respectively, secured thereto. A portion of release handle 131 is inwardly turned as at 135 and rotatably supported through opening 136 in bracket 137 depending from the bottom plate 111. In like manner the inwardly turned portion 138 of release handle 132 is rotatably supported through openings 139 in bracket 140 depending from bottom plate 111. The inwardly turned portions 135 and 138 are joined by the coupling 141.

Pin-connected to the bracket 133 is an upstanding release rod 142 which extends through hole 123 of the bottom plate 111 into contact with the bottom of the spring assembly 38. In like manner, a release rod 143 is pin-connected to bracket 134 on the release handle 132. The operation of this embodiment of my coupler centering device will now be explained. Considering the arrangement as shown in FIG. 12 of the drawings, it can be appreciated that the coupler is in its center position with the rollers on the actuating arms resting along the sides of the coupler shank. As in the first embodiment of my device, the spring assembly associated with each actuating arm is not producing any pressure against the coupler shank, but if the coupler is moved sidewise the linkage on that side is moved and, assuming the spring assembly is latched on its bar 117, the relative movement of the cylinder 58 and piston 64 causes the spring to exert a force against the coupler tending to return it to its center position.

If it is desired to release the coupler centering device, the release handle 131 or 132 may be manually lifted so that the release rods 142 and 143 move upward and lift the spring assembly 38 upward and thereby unlatch the keyway 126 from its associated bar 117. As previously explained, the cylinder 58 will then not be fixed relative to the movable piston 64 and the centering device does not restrict the sidewise movement of the coupler. When the coupler comes back to its center position the cylinder 58 will be pulled back by the coil spring 130 to a position where the keyway 126 falls over the bar 117 and latches. In both of the embodiments of my coupler centering device described above an important feature of the invention lies in the use of a precompressed spring combined with the unique spring assembly. With this particular arrangement it is possible to provide a single spring device as in the first embodiment or a double spring device as in the second embodiment so that the device can be mounted under the coupler or to the sides of the coupler. In either case, the spring assembly or assemblies are combined with relatively simple linkage systems having a point or roller contact with the side walls of the coupler shank. This, of course, has obvious advantages such as permitting relatively free longitudinal movement of the coupler shank within the elements of the device. On the other hand, the novel spring assembly is immediately effective with a predetermined spring force to resist sidewise movements of the coupler from its central position. This is accomplished with a relatively small travel of piston and cylinder in the spring assembly as compared to the movement of the coupler.

In addition to the features of the device relative to its function as a coupler centering device, the device also incorporates quite simple manual release means which are instantly available when required.

Figure 25:
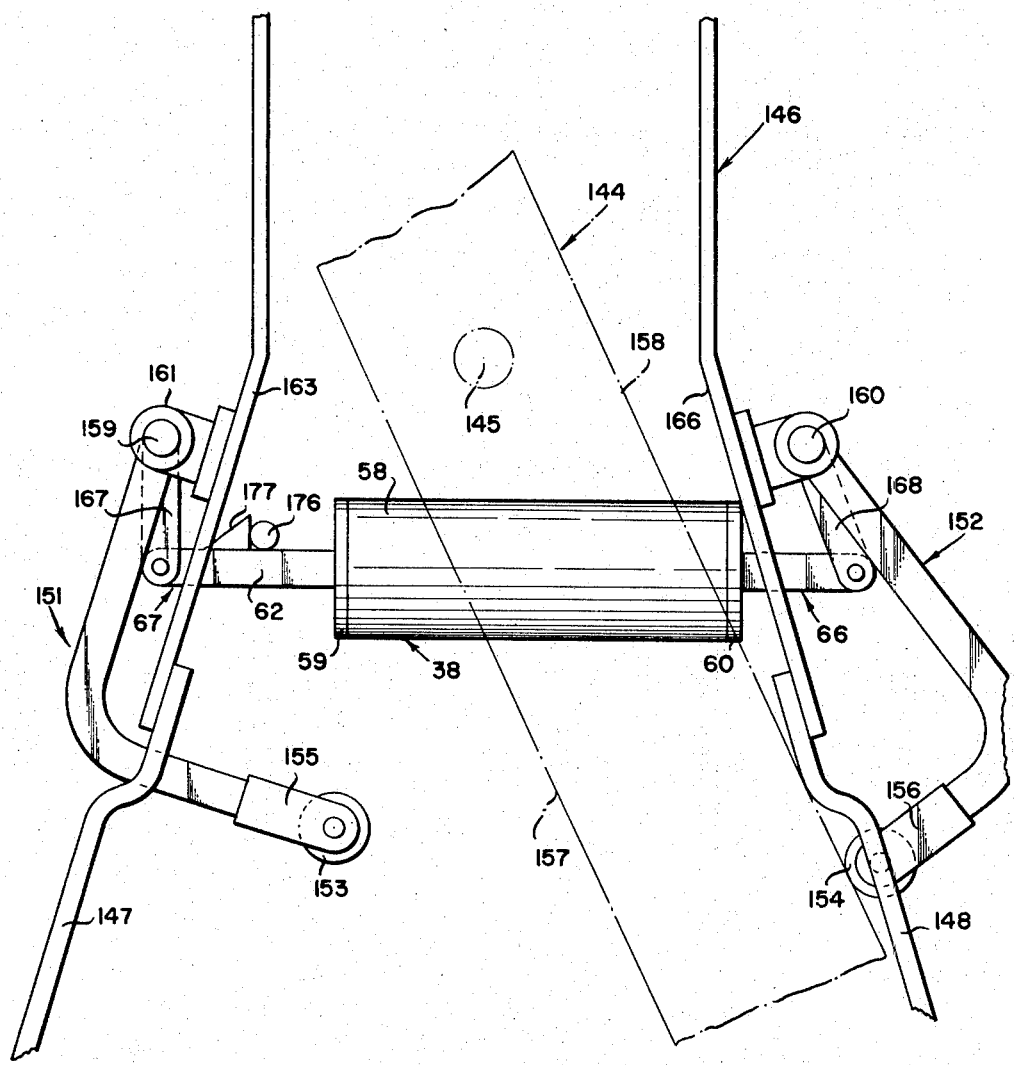
FIGURE 25 is a top plan view similar to FIG. 23 but showing the coupler shank displaced to the right of its center position.

A third embodiment of my coupler centering device is shown in FIGS. 23, 24 and 25 of the drawings. This embodiment is somewhat similar to the second embodiment of my device illustrated in FIGS. 12–22, inclusive, of the drawings, wherein the actuating arms of the device have a roller contact with the sides of the coupler shank. This embodiment is likewise similar to the previously described second embodiment in that the actuating arms are associated with rotatable shafts disposed outside of and on the sides of the flared openings of the center sill. However, this third embodiment of my device differs materially from the second embodiment in the arrangement of a single spring assembly between the actuating arms instead of a double spring arrangement as shown in FIGS. 12–22, inclusive, of the drawings.

In the embodiment illustrated in FIGS. 23, 24 and 25, a portion of the conventional coupler is shown at 144. As in previously described embodiments, this shank is suitably connected by means of a pivot pin, such as that designated 145, to draft gear carried within the center sill generally indicated at 146. The flared wall portions 147 and 148 of the center sill 146 have openings 149 and 150 therein through which actuating arms, generally indicated at 151 and 152, respectively, can project. Rollers 153 and 154 are mounted in clevises 155 and 156 carried on arms 151 and 152, respectively, so that the rollers are in rolling contact with the side walls 157 and 158 of coupler shank 144.

The ends of the actuating arms 151 and 152 opposite the ends carrying rollers 153 and 154, are secured by suitable means, such as welding, to upper portions of vertically disposed shafts 159 and 160, respectively. The shaft 159 is rotatably carried in spaced bearing lugs 161 and 162 secured, as by welding, to side wall portions 163 of the center sill 146. Likewise, the shaft 160 is rotatably carried in the spaced bearing lugs 164 and 165 on the side wall portion 166 of sill 146. At the lower portion of shafts 159 and 160, arms 167 and 168, respectively, project radially outward from each shaft.

Horizontally disposed and underlying the coupler shank 144 is a single spring assembly used in this embodiment. This assembly is the same as the spring assembly 38 previously described in connection with the device illustrated in FIGS. 1 to 11, inclusive, of the drawings, and to avoid repetition of the description, like reference numbers have been used in FIGS. 23, 24 and 25. Thus, as can be seen, the arm 167 is pivotally connected within the clevis 67 on shaft 62, and arm 168 is pivotally connected within clevis 66 on end plate 60.

As seen in FIG. 24, release handles 169 and 170 are joined by a rod portion 171 which is horizontally disposed under the spring assembly 38. The rod portion 171 is rotatably carried in spaced bearing lugs 172, 173 and 174 on a plate 175 that is secured by welding to wall portions 147 and 148. An arm 176 is secured to rod portion 171 near bearing lug 173 and projects upward to lie adjacent shaft 62 of the spring assembly 38. A stop lug 177 is secured to shaft 62 so as to provide a latch for arm 176. The spring housing end plate 59 also acts as a stop lug against arm 176 for movement in the opposite direction.

Figure 10:
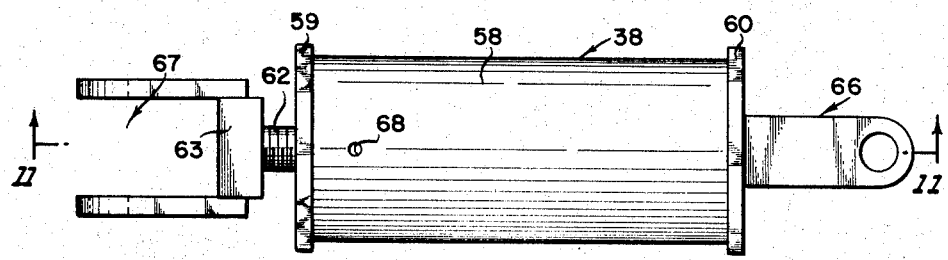
FIGURE 10 is a side elevation of the spring assembly.

The third embodiment of my device operates as follows. Looking first at FIG. 23 where the coupler shank 144 is in a center position within the center sill 146, it can be seen that rollers 153 and 154 on the actuating arms 151 and 152 rest against the side walls 157 and 158. As previously explained in conjunction with the embodiment of my device illustrated in FIGS. 1 to 11, inclusive, the coil spring 65 of spring assembly 38 is precompressed to about 1300 pounds, and consequently the piston 64 bears against end plate 60, as shown in FIG. 10, when the coupler shank is centered. Thus, in the position as illustrated in FIG. 23, rollers 153 and 154 rest against but exert no pressure on the side walls of the coupler shank 144.

Turning then, to FIG. 25 wherein the coupler shank 144 is shown as displaced to the right, it can be seen that roller 153 is no longer in contact with the side wall 157 of coupler shank 144 and that roller 154 is bearing against the coupler side wall 158. It will be noted that because arm 176 is latched against lug 177, shaft 62 is restrained from moving toward the right as the cylinder 58 is moved towards the side wall portion 166 through the force exerted by coupler shank 144 on roller 154 and the linkage consisting of the actuating arm 152, shaft 160, arm 168, and clevis 66. Thus, the spring 65 in the spring assembly 38 is further compressed between piston 64 and cylinder 58 and tends to apply a counteracting force through the same linkage to roller 154 on side wall 158 to urge the coupler shank 144 back to the center position illustrated in FIG. 23.

In a similar manner, when the coupler moves to the left, lug 177 will bear against the spring housing end plate 59 to cause the shaft 62 to move relative to cylinder 58, which further compresses the spring 65 and exerts a force on roller 153 to urge the coupler 144 back to center position.

Next assume that for some reason, such as coupling on a curve, it is desirable that the coupler centering device illustrated in FIGS. 23, 24 and 25 not operate against the side walls of the coupler shank 144 to restrain the coupler shank in its centered position within the center sill 146. In this situation either release handle 169 or 170 can be manually moved upward to rotate rod portion 175 and with it the arm 176. Rotation of arm 176 moves this arm from latching engagement against the lug 177. From the previous discussion of the action of the spring assembly 38, it should be apparent that if shaft 62 and associated piston 64 are not latched with respect to cylinder 38, then there will be no relative movement between these elements and spring 65 does not act against either of the actuating arms 151 or 152.

From the above description of the third embodiment of my coupler centering device, it can be appreciated that I have provided an arrangement wherein the single spring assembly can be associated with the actuating arms of the second embodiment of my device. Experience has indicated that in order to eliminate any interference with parts of the striker and draft gear on the coupler it may, under certain circumstances, be desirable to use the single spring assembly in preference to the double spring assembly. In this connection I have found it necessary to utilize each of the three embodiments of my device in particular circumstances to meet the requirements of various car conditions.

I claim:
1. In a railroad car coupler centering device adapted to be disposed adjacent the shank of the coupler, including a frame having portions underlying and disposed at each side of said shank, actuating means pivotally mounted on said underlying portion, said actuating means including a pair of arms with an arm located at each side of said shank and extending upward between said side portions to have selective engagement with the opposite side walls of said coupler shank, spring assembly means pivotally connected with said arms of said actuating means intermediate said underlying portion and the bottom wall of said coupler shank, a locking bar generally horizontally positioned to movably extend through each of said side portions and be pivotally connected to an adjacent arm of said actuating means between the point of selective engagement of the arm with said side walls of said coupler shank and said underlying portion of said frame, latch means arranged between each of said locking bars and its associated side portion to prevent inward movement of said locking bar beyond a position where said actuating means are in engagement with each of the side walls of said coupler shank when the coupler shank is in substantially center position.

2. The device as in claim 1 wherein said spring assembly includes relatively movable cylinder and piston means having resilient means disposed therebetween, said cylinder being pivotally connected to an arm of the actuating means at one side of said coupler shank, and the piston being pivotally connected to the other arm of the actuating means.

3. The device as in claim 2 wherein said resilient means is a precompressed spring.

4. The device as in claim 1 wherein manually operable means are rotatably mounted on said underlying portion and associated with said locking bars so that said locking bars can be unlatched from said side portions.

5. In a railroad car coupler centering device adapted to be connected to the coupler housing of a wide swing coupler, including means secured at each side of said housing to support and position a spring assembly and associated swingable actuating means, said spring assembly having a cylinder and piston with resilient means therebetween, said cylinder and piston being relatively movable on said means, said actuating means having a pair of offset arms secured to a vertically disposed pivotal connection on said means, one of said arms being pivotally connected to a shaft carrying said piston, the other arm extending through a side of the sill to support roller means adjacent a corresponding longitudinally disposed side wall of the shank of said coupler, each of said cylinders having latch means selectively engageable with a fixed point on said means, said latch means being so positioned that when said cylinders are latched to said fixed points the rollers on said other arms will contact the opposite side walls of said coupler shank when said coupler is in its center position in said coupler housing and in this position said spring assemblies do not act through said actuating means to cause a force to be applied to the side walls of said coupler shank by either of said rollers.

6. The device as in claim 5 wherein the resilient means in each of said spring assemblies is a precompressed spring.

7. The device as in claim 5 wherein manually operable means are carried by the housing and associated with each of said spring assemblies whereby said spring assemblies may be selectively unlatched from said fixed points.

8. The device as in claim 7 wherein a second spring means is associated with each of the spring assemblies to return said spring assemblies to latching engagement with the fixed points when said coupler is returned from an offset to a central position within the housing.

9. In a railroad car coupler centering device adapted to be connected to a coupler housing of a wide swing coupler, including means secured at each side of said housing to pivotally support a pair of actuating means, each of said actuating means having a portion which projects through said housing, said portion carrying roller means adapted to rest against the adjacent side walls of the shank of the coupler when said shank is in its centered position within said housing, said actuating means also including linkage members, the linkage member of one actuating means being connected to a cylinder member, the linkage means of the other actuating means being pivotally connected to a shaft carrying a piston within said cylinder member, resilient means disposed between said piston means and said cylinder, latch means disposed between the housing and said shaft and said cylinder member whereby a lateral displacement of the shank of the coupler against the roller of the adjacent actuating means will cause a relative displacement of said shaft and said cylinder member to compress said resilient means and apply a force through said adjacent actuating means tending to return said shank of said coupler to its centered position.

10. The device as in claim 9 wherein the resilient means is a precompressed spring.

11. The device as in claim 9 wherein manually operable means are carried by the housing and associated with said latch means whereby said latch means can be disengaged from said shaft and said cylinder member and lateral movement of the shank of said coupler from its centered position is permitted without a relative movement between said shaft and said cylinder member.

12. The combination with a laterally swingable and longitudinally moveable railroad car coupler, and a striker through which the coupler shank projects, of means for urging said coupler toward coaxial position with said sill, said means comprising a yoke mechanism consisting of a pair of independently moveable arms bearing at one end against opposite sides of said coupler shank, the other ends of said arms being pivotably mounted to a car part yoking said coupler shank, and resilient means extending between said arms to restrain movement of said arms, the connection of said resilient means and said arms being intermediate the ends of said arms so that the movement of said resilient means is always less than the movement of the arm displaced by lateral movement of said coupler, whereby movement of the coupler shank laterally of its centerline position will cause one of the yoke arms to exert a force on said coupler shank to urge it to return to centerline position.

13. The structure of claim 12 wherein said yoke mechanism includes a pair of vertical shafts rotating in fixed bearings, said independently movable arms being attached to and moveable by the rotation of said shafts.

14. The structure of claim 12 and means whereby said resilient means can be released to thereby allow the coupler shank to move laterally without a force being applied to either of said moveable arms.

References Cited
UNITED STATES PATENTS

| 778,514 | 12/1904 | Tesseyman | 213—20 |
| 850,498 | 4/1907 | Scott et al. | 213—20 |
| 3,108,697 | 10/1963 | Metzger | 213—21 |
| 3,258,131 | 6/1966 | Manyek | 213—19 |

ARTHUR L. LA POINT, *Primary Examiner.*

DRAYTON E. HOFFMAN, *Assistant Examiner.*